United States Patent Office 2,749,368
Patented June 5, 1956

2,749,368

PRODUCTION OF ARALKYL HYDROPEROXIDES

Jan Pieter Fortuin, Amsterdam, and Hein Israel Waterman, Delft, Netherlands, assignors to Shell Development Company, Emeryville, Calif., a corporation of Delaware No Drawing. Application July 20, 1953,
Serial No. 369,212

Claims priority, application Netherlands
September 15, 1952

7 Claims. (Cl. 260—610)

This invention relates to improvements in the production of aralkyl hydroperoxides.

In copending application Serial No. 274,842, filed March 4, 1952, now U. S. Patent 2,730,550 issued January 10, 1956, of which the present application is a continuation-in-part, it was disclosed and claimed that the decomposition of α,α-dialkyl aralkyl hydroperoxides is inhibited during the production and storage of such hydroperoxides by the presence of a metal selected from the elements of sub-group I of the periodic table of the elements.

It has now been found that substantial improvement, as evidenced by increased yields, reduction of undesired by-products, and particularly by elimination of induction periods of inordinate lengths, is obtained in the oxidation of alkyl-substituted aromatic hydrocarbons, wherein carbon in the α-position with respect to the aryl nucleus is a secondary carbon atom, by the presence of a metal selected from the elements of subgroup I of the periodic table of the elements and alloys thereof. Alkyl-substituted aromatic hydrocarbons oxidized in accordance with the present invention comprise the compounds represented by the empirical formula

in which Ar represents an aromatic hydrocarbon radical selected from the group consisting of aryl and alkaryl groups, and R represents a member consisting of alkyl radicals. By the term "alkyl radicals" as employed herein it is intended to include not only the open chain alkyl radicals but also cycloalkyl groups. The radical Ar may be mono- or poly-nuclear and may be further substituted by minor substituents. Comprised in the class of compounds defined by foregoing Formula I are the aralkyl hydrocarbons wherein alkyl radical R of Formula I forms a closed carbocyclic ring structure with the aryl nucleus as in tetrahydronaphthalene (Tetralin) and the like. Members of the above class of aralkyl hydrocarbons comprise, for example, the alkyl benzenes wherein all carbon in the α-position with respect to the benzene ring is primary or secondary carbon such as, for example, ethyl benzene, propyl benzene, and tetrahydronaphthalene.

The invention is directed particularly to the oxidation of the aralkyl hydrocarbons of the above-defined class exemplified by formula I to reaction products comprising the corresponding hydroperoxides wherein the hydroperoxide (—OOH) group is directly attached to the carbon atom in the α-position with respect to the aryl nucleus. Thus, the hydroperoxides obtained in accordance with the process of the invention may be represented by the following empirical formula:

wherein Ar and R represent the same radicals as indicated above in the definition of empirical Formula I. Examples of such aralkyl hydroperoxides produced in the process of the invention comprise, for example, ethyl benzene hydroperoxide, tetrahydronaphthalene hydroperoxide, and the like.

The oxidation is executed by the passage of molecular oxygen, i. e., oxygen, or a gaseous stream providing molecular oxygen such as, for example, air, through the aralkyl hydrocarbon while the latter is maintained substantially in the liquid state.

The aralkyl hydroperoxides thus produced are employed as polymerization accelerators and as catalysts in reacting macromolecular compounds, such as rubber, and as starting and intermediate materials in the production of valuable chemical derivatives therefrom.

Methods for preparing these hydroperoxides by the oxidation with molecular oxygen of the corresponding aralkyl hydrocarbons have been disclosed heretofore. Such methods are, however, often handicapped by inherent difficulties militating against practical operation of the process. Thus, exceedingly long induction periods are often encountered. Yields are often below a value commensurate with practical scale operation. To overcome these difficulties it has been proposed to add various materials as catalysts or as initiators for the reaction. Often, undesired effects of these materials, such as, for example, a tendency to promote undue conversion of the desired hydroperoxides to undesired products has tended to offset advantages inherent in their use.

It has now been found that aralkyl hydrocarbons wherein carbon in α-position to the aryl nucleus is primary or secondary carbon, can be oxidized with molecular oxygen to the corresponding hydroperoxide with substantially increased efficiency by executing the oxidation in the presence of a metal selected from elements of subgroup I of the periodic table of the elements, and alloys thereof, such as, for example, copper, silver, gold, and alloys thereof. The objects of the invention may be achieved by carrying out the oxidation reaction in a reaction zone wherein all wall surfaces coming into direct contact with the reaction mixture under the conditions of execution of the oxidation consist essentially of a metal selected from the group consisting of the members of subgroup I of the periodic table of the elements and alloys thereof. Surfaces consisting essentially of copper or alloys thereof, such as brass, copper alloys and the like, are preferred. The metal surfaces coming into direct contact with the reaction mixture during execution of the reaction need not be smooth or polished. It is generally preferred to etch the metal surface before use, for example, by treatment with concentrated nitric acid.

Contact of the reactants or reaction products with metals other than the members of subgroup I of the periodic table of the elements or alloys thereof during the course of the reaction is avoided.

It has been found that the objects of the invention may be achieved by employing as the reaction zone a vessel or chamber, the walls of which coming into contact with reactants or reaction products during the oxidation are made of a relatively inert material, such as glass, and incorporating in the liquid reactants the metals of subgroup I. Metals of subgroup I are then incorporated in the reaction mixture in a state of relatively fine subdivision. Thus, the metals of subgroup I may be suspended in the liquid reactants in the form of a powder. Comprised within the scope of the invention is the presence of subgroup I in the reaction zone in the form of less finely divided materials, such as, for example in the form of rough beads, turnings, chunks, strips, etc.

In carrying out the oxidation of the aralkyl hydrocarbons in accordance with the invention, oxidizing conditions employed are generally those disclosed in the prior art as suitable for molecular oxidation of such hydrocarbons with the exception, however, that the oxidation is executed in the presence of a metal of subgroup I of the periodic table and in the absence of any substantial amount of other metals.

The oxidation is carried out in the liquid phase. The presence of water or aqueous solutions in large proportions with respect to the aralkyl hydrocarbons is preferably avoided, the oxidation being preferably performed either under substantially anhydrous conditions or in the presence of only such small amounts of water that the formation of a second liquid phase is avoided.

The metals of subgroup I may be employed in the presence of materials known to be catalysts for the oxidation reaction. However, any advantage in their use is often offset by the cost and complexity of the procedure required for their subsequent removal from the reaction products. Additional materials capable of initiating the reaction may also be employed within the scope of the invention. The use as initiators of the same hydroperoxides as produced in the process is generally desirable since their use does not render more difficult the problem of product separation. A minor proportion of previously oxidized aromatic compound may be recycled to the aralkyl hydrocarbon charge to the oxidation.

The aralkyl hydrocarbons to be oxidized may be pretreated by methods directed to their purification. Suitable methods may comprise one or more such steps as, for example, distillation, extractive distillation, clay treatment, refluxing in the presence of metallic sodium, treatment with alkaline materials, selective hydrogenation treatments, and the like.

Molecular oxygen employed as the oxidizing agent need not be pure oxygen and may be in the form of any available molecular oxygen-containing gas. Air is generally preferred. The oxygen, air, or other oxygen-containing gas, may be humidified or dried before introduction into the reaction zone.

The effect of the presence of the metals of subgroup I in the reaction zone makes it possible to carry out the oxidation at somewhat higher temperatures than usually employed heretofore. In general, temperatures in the range of from about 50° C. to the boiling point of the aromatic hydrocarbons may be employed, but temperatures above 100° C. are generally preferred. A temperature in the range of, for example from about 100 to about 135° C. is particularly preferred.

A particular advantage of the present invention resides in the ability to obtain efficient oxidation of the aralkyl hydrocarbons in the absence of any appreciable induction period and in a substantial increase in yield of the desired aralkyl hydroperoxide.

Although pressures greater than atmospheric pressure may be employed within the scope of the invention, the use of such higher pressures when executing the reaction in the presence of metals of subgroup I does not in general result in any substantial increase in yield of the desired hydroperoxide. It is therefore preferred to carry out the oxidation at a pressure ranging from about atmospheric to relatively low superatmospheric pressures. The reaction is preferably executed under conditions assuring intimate contact of the molecular oxygen with the reactants. This is obtained by the use of conventional agitating means, such as, stirrers, impellers, nozzles, the use of porous plate and the like. In a suitable method of carrying out the process the oxygen or an oxygen-containing gas is bubbled through a relatively deep pool of the reactants. In such type of operation a dispersion of gas and liquid may be discharged from the reaction zone into a suitable separator wherein a gaseous phase comprising inert gases and unconverted oxygen is separated from a liquid phase comprising oxidized and unconverted hydrocarbons. The resulting oxidized hydrocarbons are separated from the reaction mixture by suitable separating means which may comprise one or more such steps as, for example distillation, extractive distillation, solvent extraction and the like. The aralkyl hydroperoxides thus recovered may be further purified, such as, for example, by distillation at reduced pressure. A suitable means of recovering the hydroperoxides comprise the conversion of the peroxides to the corresponding sodium salt thereof by means of concentrated sodium hydroxide solution. The precipitate salt is separated by filtration and the desired hydroperoxide liberated therefrom by subjecting the salt to conditions resulting in its decomposition with the liberation of the desired hydroperoxide. The residual liquid may be treated with a suitable organic solvent such as an aromatic hydrocarbon, for example, benzene. Solvent is distilled from the extract phase to recover oxidized aralkyl hydrocarbons.

Although the process of the invention is applied to the broad class of compounds consisting of the aralkyl hydrocarbons wherein the carbon in the alpha-position to the aryl nucleus is a secondary carbon atom. It is of particular value in the preparation of the tetrahydronaphthalene hydroperoxide from commercially available tetrahydronaphthalene. Although the invention is directed primarily to the production of aralkyl hydroperoxides corresponding to the aralkyl hydrocarbons from which they are derived, it is to be understood that it is not necessarily limited thereto and that conditions of oxidation may be modified to result in a more drastic oxidation of the aralkyl hydrocarbon under controlled conditions to result in the obtaining of reaction mixtures comprising aldehydes or acids corresponding to the aralkyl hydrocarbons oxidized.

The following examples are illustrative of the conversion of aralkyl hydrocarbons to the corresponding aralkyl hydroperoxides in accordance with the process of the invention.

*Example I*

225 cc. of ethylbenzene were introduced into a copper reaction vessel of 500 cc. capacity provided with an inlet near the bottom thereof and an outlet at the top. The reaction vessel was provided with reflux condenser, thermometer and copper stirrer. Oxygen was introduced into the vessel through a flow meter at a rate of 25 liters per hour for a period of 7 hours. Exit gas was eliminated from the reactor through the reflux condenser. The contents of the reactor were maintained at a constant temperature of 120° C. throughout the oxidation by immersion of the reactor in an oil bath; the liquid level of the oil in the bath being just above that of the reactor contents. For the purpose of comparison a parallel operation was carried out under substantially identical conditions with the exception that the reaction vessel employed was made of steel instead of copper.

A conversion of ethylbenzene to ethylbenzene hydroperoxide of 7% was obtained in the operation employing the copper vessel, whereas in the operation employing the steel reactor the conversion of ethylbenzene to the ethylbenzene hydroperoxide amounted to only 2.9%.

*Example II*

225 cc. of tetrahydronaphthalene (Tetralin) were oxidized in a copper reaction vessel under the conditions described for the oxidation of ethylbenzene in the foregoing Example I with the exception that oxygen was passed through the reaction mixture for only one hour instead of 7 hours. The operation was repeated in an independent and parallel operation for the purpose of comparison under substantially identical conditions but with the exception that a steel reactor was employed instead of a copper reactor. A conversion of tetrahydronaphthalene to tetrahydronaphthalene hydroperoxide of 24.2% was obtained in the operation employing a copper reaction vessel, whereas in the operation employing a steel reactor the conversion of tetrahydronaphthalene to tetrahydronapthalene hydroperoxide amounted to only 3.2%.

The invention claimed is:

1. In a process for converting a hydrocarbon of the group consisting of alkyl-substituted benzene wherein the carbon atom in the alpha position with respect to the aromatic ring is a secondary carbon atom and tetrahydronapthalene to the corresponding hydroperoxide wherein the hydroperoxy group is attached directly to the carbon atom linked directly to the aromatic ring by the reaction of said hydrocarbon with an oxygen-containing gas, the improvement which comprises effecting said reaction in the liquid phase at a temperature in the range of from about 50° C. to the boiling temperature of said hydrocarbon in the presence of metallic copper.

2. In the process for the conversion of ethylbenzene to reaction products comprising ethylbenzene hydroperoxide by the reaction of hydrocarbons comprising said ethylbenzene with an oxygen-containing gas, the improvement which comprises effecting said reaction in the presence of metallic copper in the liquid phase at a temperature of from about 50° C. to the boiling temperature of ethyl benzene.

3. Process in accordance with claim 2 wherein said reaction is executed at the temperature in the range of from about 100 to about 135° C. in the presence of copper.

4. In the process for the conversion of tetrahydronaphthalene to reaction products comprising tetralin hydroperoxide by the reaction of hydrocarbons comprising tetralin with an oxygen-containing gas, the improvement which comprises effecting said reaction in the presence of metallic copper in the liquid phase at a temperature of from about 50° C. to the boiling temperature of tetrahydronaphthalene.

5. The process in accordance with claim 4 wherein said reaction is executed at a temperature of from about 100 to about 135° C.

6. In a process for the production of reaction products comprising ethylbenzene hydroperoxide by the reaction of ethylbenzene with an oxygen-containing gas, the improvement which comprises effecting said reaction in the liquid phase at a temperature of from about 100 to about 135° C. in a reaction zone wherein all surfaces of said reaction zone coming into direct contact with reactants consist essentially of copper.

7. In a process for the production of reaction products comprising tetrahydronaphthalene hydroperoxide by the reaction of tetrahydronaphthalene with an oxygen-containing gas, the improvement which comprises effecting said reaction at a temperature of from about 100 to about 135° C. in a reaction zone wherein all surfaces of said reaction zone coming into direct contact with reactants consist essentially of copper.

References Cited in the file of this patent

UNITED STATES PATENTS

| | | |
|---|---|---|
| 2,454,804 | Johnson | Nov. 30, 1948 |
| 2,632,772 | Armstrong et al. | Mar. 24, 1953 |

OTHER REFERENCES

Kreulin: Jour. Institute of Petroleum 38 (1952), pg. 449 (entire article pgs. 449–457).